(12) United States Patent
Haberstroh et al.

(10) Patent No.: US 8,057,232 B2
(45) Date of Patent: Nov. 15, 2011

(54) KIT WITH INTEGRAL SKETCHING DEVICE

(76) Inventors: Charles Haberstroh, San Diego, CA (US); Martin P. Haberstroh, San Diego, CA (US)

(*) Notice: Subject to any disclaimer, the term of this patent is extended or adjusted under 35 U.S.C. 154(b) by 45 days.

(21) Appl. No.: 12/490,123

(22) Filed: Jun. 23, 2009

(65) Prior Publication Data

US 2010/0105014 A1 Apr. 29, 2010

Related U.S. Application Data

(60) Provisional application No. 61/197,059, filed on Oct. 23, 2008.

(51) Int. Cl.
*G09B 11/00* (2006.01)
(52) U.S. Cl. .......................................................... 434/85
(58) Field of Classification Search .................... 434/81, 434/85, 87, 88, 261
See application file for complete search history.

(56) References Cited

U.S. PATENT DOCUMENTS

| | | | | |
|---|---|---|---|---|
| 2,075,529 A | * | 3/1937 | Leubrie | 434/88 |
| 2,103,943 A | * | 12/1937 | Gorton | 434/88 |
| 2,220,527 A | * | 11/1940 | Friedrich | 434/81 |
| 3,384,964 A | | 5/1968 | Phillips | |
| 3,492,743 A | * | 2/1970 | Schmidt | 434/88 |
| 4,451,519 A | * | 5/1984 | Irrgeher | 428/167 |
| 4,563,154 A | * | 1/1986 | Vandervort et al. | 434/87 |
| 4,836,783 A | * | 6/1989 | Harper | 434/87 |
| 5,100,324 A | * | 3/1992 | Slayton | 434/87 |
| 5,195,893 A | * | 3/1993 | Casale | 434/87 |
| 5,533,900 A | * | 7/1996 | Volk | 434/87 |
| 5,772,247 A | * | 6/1998 | Legrand | 281/31 |
| 5,989,033 A | * | 11/1999 | Burgio | 434/88 |
| 6,802,717 B2 | * | 10/2004 | Castro | 434/169 |
| 6,916,179 B2 | * | 7/2005 | Thornton | 434/85 |
| 7,156,017 B1 | * | 1/2007 | Ingraselino | 101/129 |
| 2002/0009695 A1 | * | 1/2002 | Rasheed et al. | 434/85 |
| 2004/0096807 A1 | * | 5/2004 | McGannon | 434/87 |
| 2008/0070200 A1 | | 3/2008 | Hachey et al. | |
| 2008/0241802 A1 | | 10/2008 | Hachey et al. | |

OTHER PUBLICATIONS http://www.freehanddesign.com; FreeHand Design System company website; Mar. 16, 2010.

* cited by examiner

*Primary Examiner* — Kurt Fernstrom
(74) *Attorney, Agent, or Firm* — Fish & Associates, PC

(57) ABSTRACT

A kit for guiding a user is drawing a trace includes a sketching device coupled to a paper tablet. The sketching device comprises a first pattern of raised bumps sized and positioned to form a plurality of intersecting grooves along the surface of the sketching device.

13 Claims, 6 Drawing Sheets

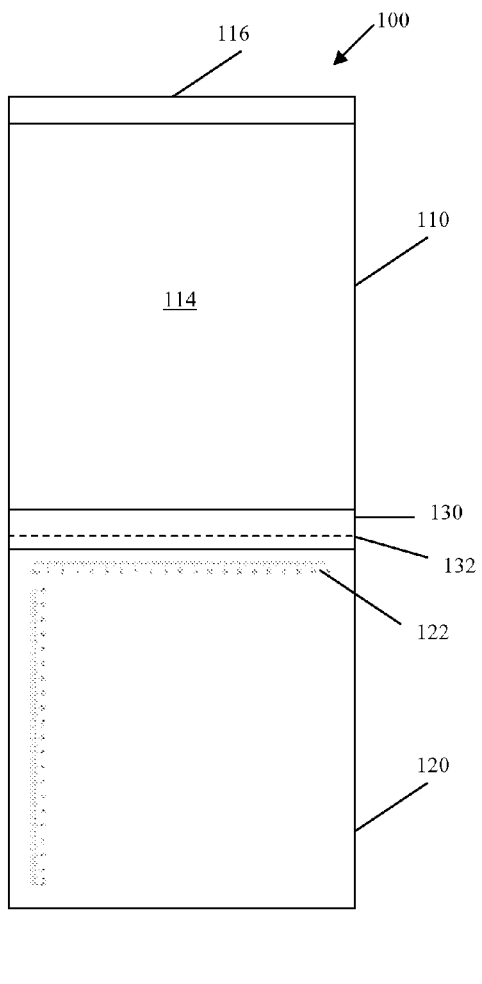
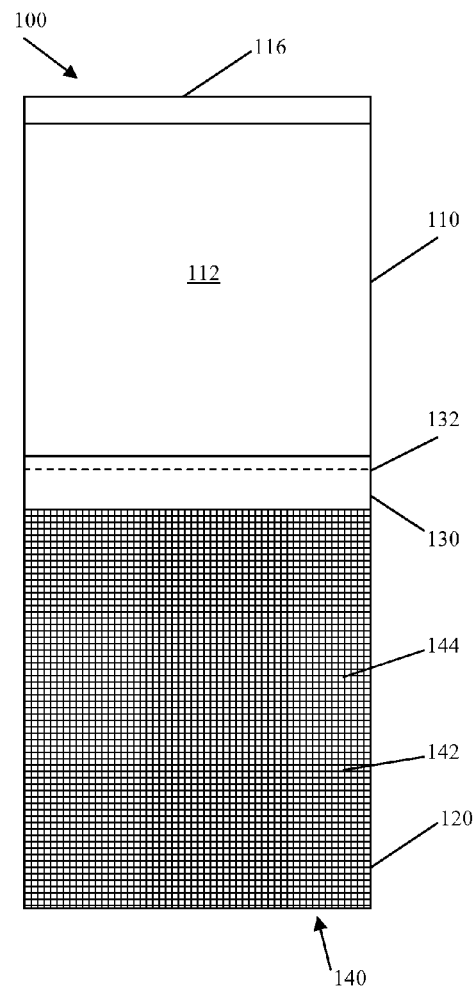
Figure 1A                    Figure 1B

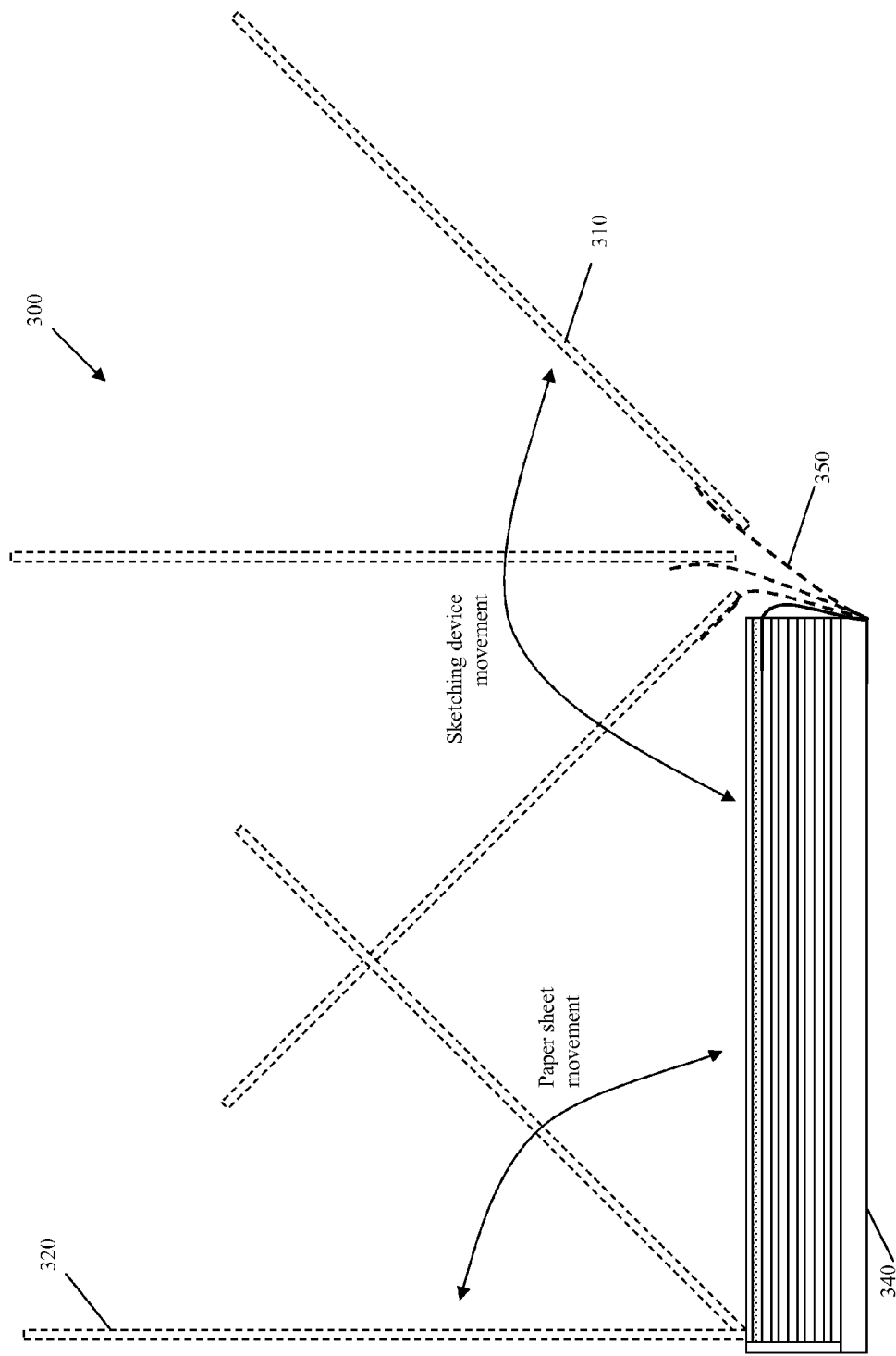

KIT WITH INTEGRAL SKETCHING DEVICE

This application claims the benefit of U.S. provisional application No. 61/197,059 filed on Oct. 23, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is sketching devices.

BACKGROUND

Traditionally, accurately drawing straight or curved lines required the use of rulers, compasses, protractors, and/or other guides. U.S. Pat. No. 3,384,964 to Phillips describes an improved guide having a plurality of grooves with rounded junctures, such that when the guide is placed beneath a paper sheet, the grooves guide the marking instrument to draw the desired line.

Such guides can be problematic, however, as they are detached from the paper sheets and are easily misplaced. In addition, the guides typically must be held exactly in place to accurately draw the line, and therefore loose guides can be more difficult to use.

Phillips also failed to provide for drawing angled or curved lines. U.S. Patent Appl. No. 2008/0241802 to Hachey, et al. (pub. October 2008) describes an improved guide comprising a clipboard having grooves that can be rotated as desired to guide a user in drawing angled lines. The '802 device, however, can be problematic as the clipboard is detached from the paper sheets, and can be misplaced. In addition, the '802 device is limited to holding only a single piece of paper while in use.

U.S. Patent Appl. No. 2008/0070200 to Hachey, et al. (pub. March 2008) describes sketch paper having grooves that embossed onto the writing paper. One problem is that the textured paper significantly limits what users can draw. Thus, for example, the grooves would likely distort non-conforming lines, such as cursive or other text.

Thus, there is still a need for paper tablet having an attached sketching device that guides a user in drawing a trace and can be moved and stored when desired.

SUMMARY OF THE INVENTION

The inventive subject matter provides apparatus in which a kit for guiding a user in drawing a trace includes a paper tablet and sketching device. As used herein, the term "trace" includes both straight and curved lines.

The term "paper tablet" includes any bound collection of two or more sheets of paper, and that preferably has a backing. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Further as used herein, the term "attached" means a connection that fastens things together.

Exemplary paper tablets include notepads and sketch books. Contemplated tablets can be bound, or otherwise attached, using any commercially suitable fastener(s) including, for example, glue and other adhesives, spiral or other shaped combs, stitching, wires, staples, clips, and other mechanical fasteners, and/or any combinations thereof. Such binding advantageously prevents the paper sheets from being unintentionally separated from the tablet. Optionally, the paper tablet could include a cover.

The paper sheets are preferably removably attached to the paper tablet such as by a perforation or other commercially practical manner. Preferred paper sheets have a weight of less than 24 pounds. The paper sheets could have any design including, for example, blank, lined, graphing, and/or any combinations thereof.

The sketching device is preferably hinged or otherwise pivotally coupled to the paper tablet. This is advantageous as it limits the possibility of the sketching device being lost or otherwise misplaced, while allowing for the device to be used or stored as desired. Thus, for example, the sketching device could be placed beneath the uppermost paper sheet, and then moved to beneath the lowermost paper sheet such as for storage.

A flexible binding can advantageously be used to couple the sketching device to the paper tablet. Contemplated bindings include, for example, combs, tape, adhesives, cardboard or other paper-like materials, and/or combinations thereof. In alternative embodiments, the sketching device could be removably coupled to the paper tablet such as by a perforation.

Preferred sketching devices comprise a first pattern of raised bumps sized and positioned to form a plurality of intersecting grooves. As used herein, the term "pattern" is defined as an array of bumps positioned with some discernable regularity, whether simple or complex. Contemplated patterns include, for example, orthogonal grids, isometric or other angled grids, rays, circles, ovals, and/or any combinations thereof. Preferably, the patterns are discernible using at least one of Cartesian coordinates, Polar coordinates, and/or logarithmic coordinates.

Preferred bumps include raised portions that are at least partially rounded. Such bumps can advantageously include apices that are approximately parallel to the surface of the sketching device to reduce the likelihood of the bumps leaving an impression on the paper sheet. The bumps can be fashioned in any commercially suitable manner(s), including, for example, embossing, molding, and/or any combinations thereof.

Contemplated bumps include pyramid-shaped portions such as those described in U.S. Pat. No. 4,451,519 to Irrgeher.

Though preferred sketching devices include between 30-120 bumps per square inch, the number of bumps will vary based upon the desired pattern and marking instrument to be used.

Optionally, the paper tablets can include sleeves configured to house at least a portion of one or more of the sketching devices. Such sleeves can be integrated into the backing of the paper tablets, or separately affixed or otherwise coupled to the tablets.

As defined herein, the term "groove" is defined as the space between two adjacent bumps. Though patterns having variable width grooves are contemplated, preferred patterns include a plurality of evenly-spaced grooves resulting from a plurality of evenly-spaced bumps each having the same size and dimension. The groove width varies along the height of the bumps. Preferred groove widths have a maximum distance of between 0.1-1.0 mm, and more preferably 0.1-0.3 mm, to provide a groove sufficient in width to accommodate typically sized pens and pencils. However, contemplated groove widths can vary as needed to accommodate pencils, pens, highlighters, art supplies, and other drawings instruments.

Advantageously, the kits can include sketching devices having grooves that accommodate marking instruments typically used with the included paper sheets. Thus, for example, kits including graphing paper could have grooves that accommodate pens and pencils, while kits including art paper could have grooves that accommodate charcoal or crayons.

In one aspect, contemplated sketching devices can include at least two, and preferably, three or more patterns of raised bumps. Though the additional pattern(s) could be overlaid on the first or other patterns, the additional patterns are more preferably disposed on a separate portion of the sketching device to guide the user in drawing other traces including for example, lines, rays, circles, ovals, alphanumeric, foreign or other characters, symbols, etc. Alternatively or additionally, one or both sides of the sketching device could include a ruler or other measuring tool such as to provide measurements to a user.

Preferably, each of the additional patterns is distinct from the first pattern. Differences could include, for example, different patterns including those described above, differently spaced grooves, differently sized and dimensioned bumps, and/or combinations thereof.

In some embodiments, the sketching device has a first pattern disposed to form a plurality of evenly spaced rows and columns such as an orthogonal grid, and a separate second pattern disposed to form a plurality of concentric circles. These patterns could be disposed on the same or different sides of the sketching device.

In one aspect, the sketching device further comprises at least one fastener configured to retain a piece of paper. Such fastener(s) could include, for example, adhesives or other glues, mechanical fasteners such as clips and snaps, pockets to receive at least a portion of the paper sheet(s), and/or any combinations thereof.

In another aspect, kits can include sketching devices and paper sheets having different colors to allow the sketching device to have greater visibility through the paper sheet. Thus, for example, the sketching device could comprise one or more dark colors (e.g., green, black, etc.), and the paper sheets could comprise a light color (e.g., white, yellow, etc.), to allow grids or other guides to be seen through the paper sheets. Contemplated sketching devices could alternatively include a white and/or other light color(s).

Preferred kits include sketching devices having approximately the same size and dimensions as the attached paper tablets. Though the sketching devices could be of any commercially practical size and dimension, preferred sketching devices are sized and dimensioned to conform to standard paper sizes including, for example, 8.5 in by 11 in, 8.5 in ×14 in, 11 in ×17 in, and A4 and A6 paper.

The sketching device can be optionally constructed from recyclable materials to allow the entire kit to be recycled when the paper sheets are exhausted.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIGS. 1A-1B are top and bottom planar views, respectively, of a kit.

FIG. 3 is a side view of the kit of FIGS. 2A-2B illustrating movement of the sketching device and paper sheets.

DETAILED DESCRIPTION

Figure 2A:
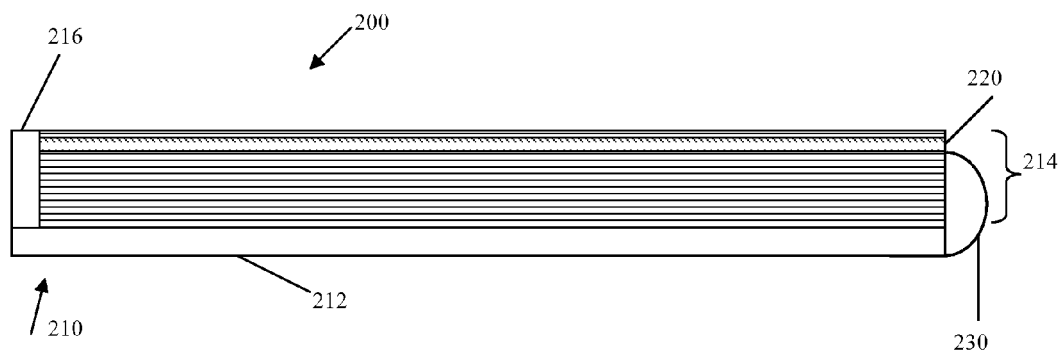
FIG. 2A-2B are side views of a kit showing the sketching device positioned beneath an uppermost paper sheet and a bottommost paper sheet, respectively.

In FIGS. 1A-1B, a kit 100 is shown for guiding a user in drawing a trace. The kit 100 includes paper tablet 110 and sketching device 120.

Paper tablet 110 comprises a backing 112 and a plurality of paper sheets 114. The paper sheets 114 and backing 112 are bound to each other by binding 116. Any commercially suitable binding could be used including those discussed above (e.g., spiral and other shaped combs, adhesives, stitching, staples, rivets, etc.). The paper sheets could have any commercially suitable color, weight, fabric, and design, and preferred paper sheets include graphing paper or blank paper, having a weight between 18-24 pounds.

Sketching device 120 is pivotally coupled to paper tablet 110 by flexible binding 130. Flexible binding 130 is coupled to each of the sketching device 120 and backing 112 by stitching 132, though any commercially suitable fastener could be used including those discussed above.

Sketching device 120 is sized and dimensioned to have the size and dimension of paper sheets 114. Alternatively, contemplated sketching devices could be of a size and dimension different from that of the paper sheets.

One side of the sketching device 120 includes ruler 122. Contemplated sketching devices could alternatively or additionally include grids or other guides. In addition, the guides could be overlain on top of a pattern of raised bumps.

As shown in FIG. 1B, sketching device 120 comprises a pattern 140 of raised bumps 142 sized and dimensioned to form an orthogonal grid. Adjacent pairs of raised bumps 142 define groove 144, and the pattern 140 of raised bumps 142 defines a plurality of intersecting grooves.

Figure 2B:
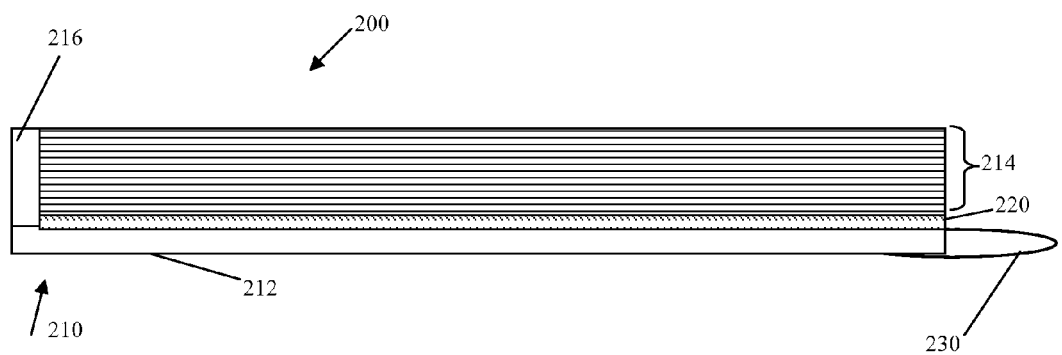

In FIGS. 2A-2B, a kit 200 includes paper tablet 210 and sketching device 220. Binding 216 couples backing 212 with paper sheets 214. Sketching device 220 is flexibly coupled to backing 212 by flexible binding 230, which allows sketching device 220 to be moved as desired. For example, the sketching device can be placed beneath the uppermost paper sheet (see FIG. 2A), and then placed beneath the lowermost paper sheet when not in use (see FIG. 2B). Alternatively, sketching devices can be coupled to the backing by a spiral or other shaped comb, and/or other commercially suitable fasteners, including those discussed above.

FIG. 3 illustrates kit 300 showing the movement of paper sheet 320 and the movement of sketching device 310 from its position in FIG. 2A to its position in FIG. 2B. Preferably, the flexible binding 350 is slidably coupled to backing 340 such that any slack of the binding can be positioned and stored along a length of the paper tablet.

Figure 4:
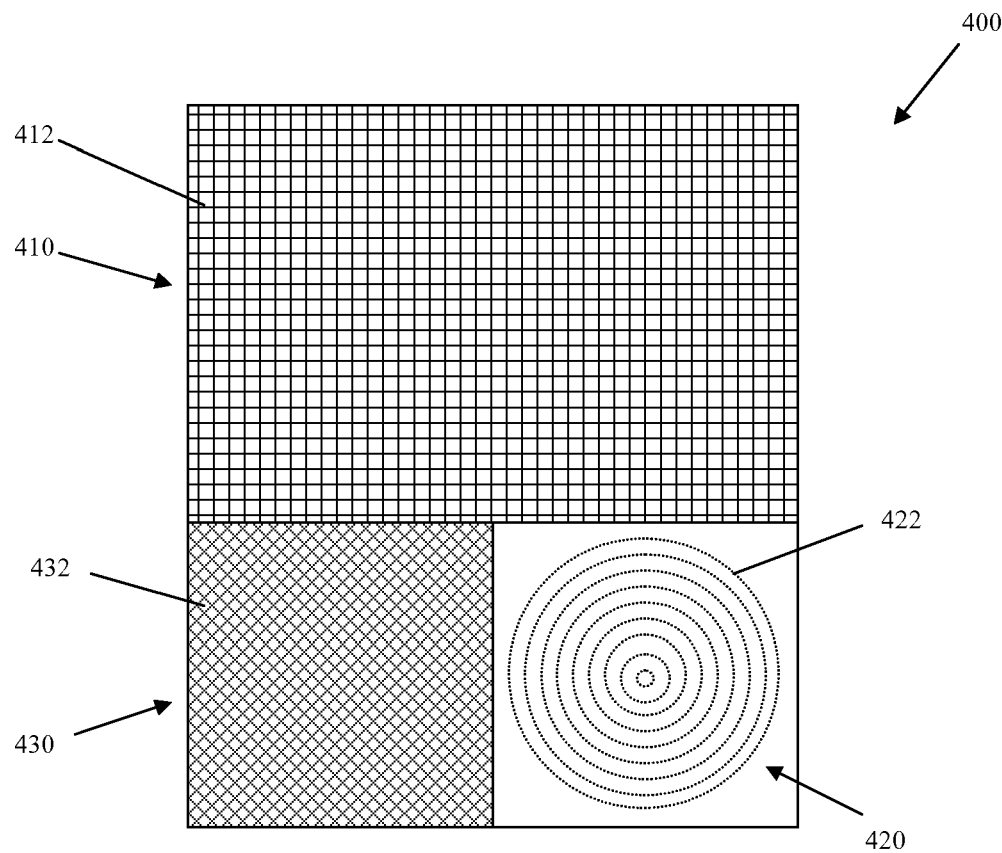
FIG. 4 is a planar view of an embodiment of the sketching device having distinct patterns of raised bumps.

FIG. 4 depicts a sketching device 400 having multiple patterns of raised bumps. A first pattern 410 includes raised bumps 412 sized and positioned to form an orthogonal grid. A second pattern 420 includes raised bumps 422 sized and positioned to form a plurality of concentric circles. A third pattern 430 includes raised bumps 432 sized and positioned to form an isometric grid. In addition to those discussed above, any commercially-suitable pattern(s) could be formed including, for example, a plurality of rays or other curved lines, various angled lines, alphanumeric or other characters, and/or combinations thereof. Contemplated sketching devices can include two or more patterns overlaid on top of one another.

Figure 5:
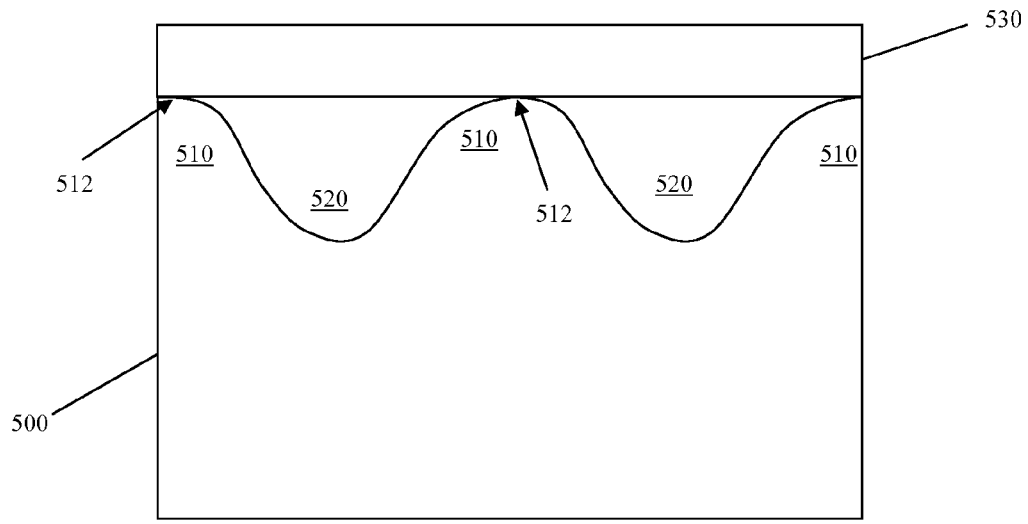
FIG. 5 is a sectional view of the sketching device with a paper sheet.

FIG. 5 depicts the raised bumps 510 having apices 512 that are approximately parallel to the surface of the sketching device 500 to reduce the likelihood of the bumps 510 leaving an impression on the paper sheet 530.

Figure 6:
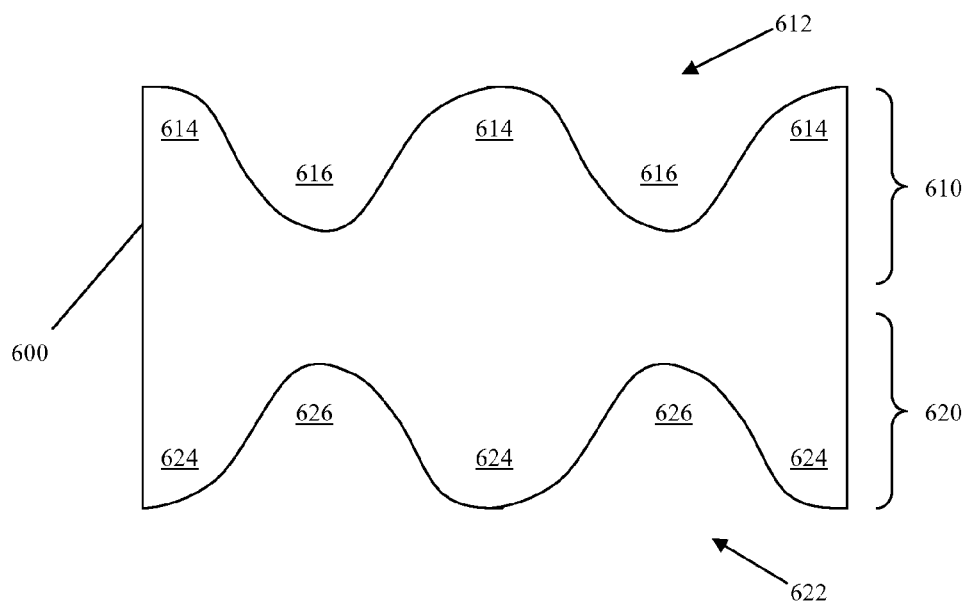
FIG. 6 is a sectional view of the sketching device having raised bumps on opposite sides.

FIG. 6 illustrates a sketching device 600 having first 610 and second sides 620. The first side 610 comprises a first pattern 612 of raised bumps 614 defining grooves 616, and the second side 620 comprises a second pattern 622 of raised bumps 624 defining grooves 626. It is contemplated that the first and second patterns 612 and 614 could be the same, though the patterns are preferably distinct. Alternatively, or additionally, one or both of the first and second sides could comprise a grid or other ruler (not shown) to allow measuring of the desired trace.

Figure 7B:
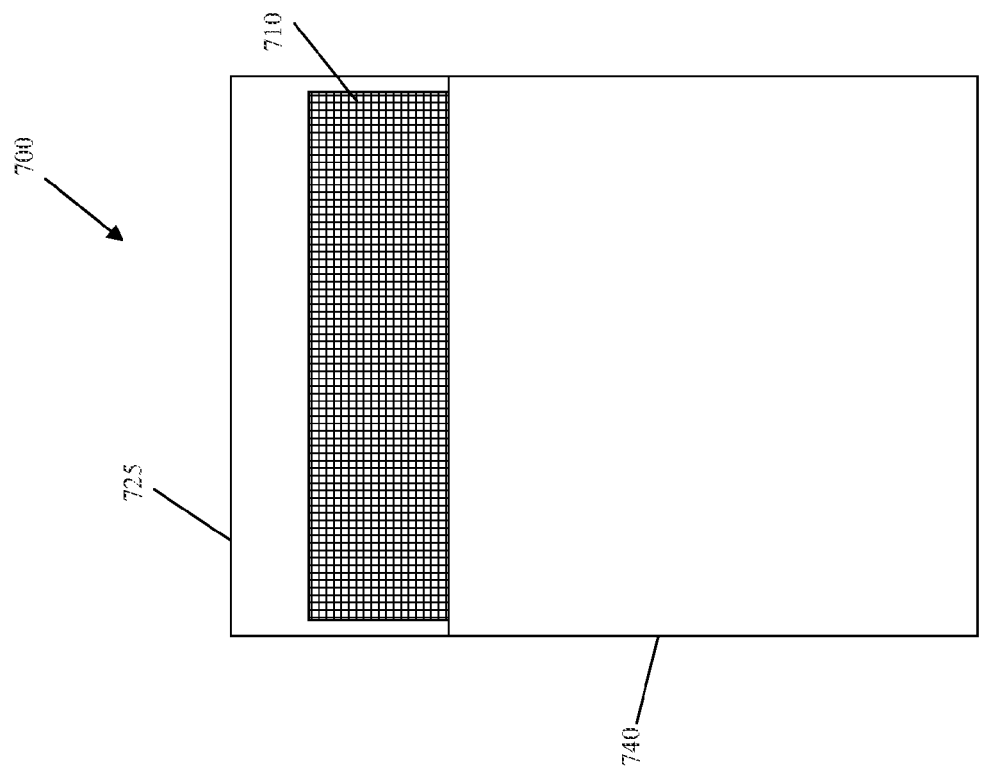
FIGS. 7A-7B are planar views of an alternate embodiment of a kit including a sketching device and paper tablet.
Figure 7A:
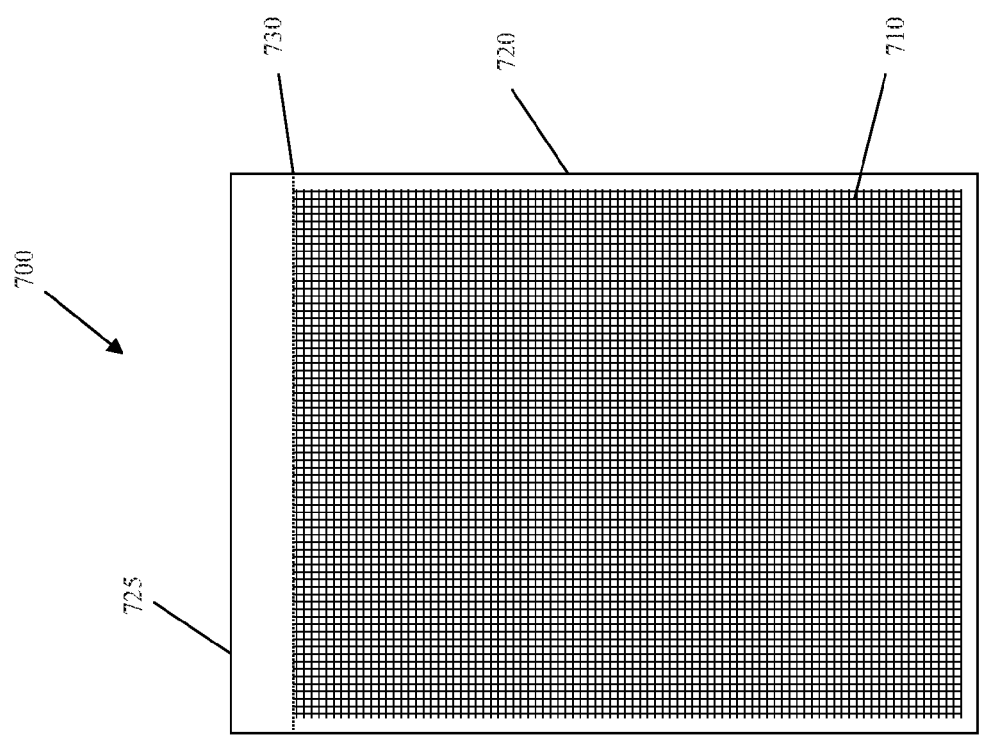

In FIGS. 7A-7B, a kit 700 comprises a sketching device 710 removably coupled to binding 725 of the paper tablet 720 by perforation 730. Once the sketching device is decoupled from binding 725, sketching device 710 can be placed in sleeve 740, as shown in FIG. 7B. Preferred sleeves are coupled to backing 750.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A kit for guiding a user in drawing a trace, comprising:
   a tablet including at least 10 sheets of paper;
   a sketching device distinct from the sheets of paper, and comprising a first pattern of raised bumps sized and positioned to form a plurality of intersecting grooves, wherein the sketching device is pivotally coupled to the tablet by a flexible binding, such that (1) an orientation of the sketching device remains fixed relative to the tablet, and (2) the first pattern of the sketching device restricts drawing on a sheet of the paper to a fixed set of straight lines relative to the orientation of the sketching device while the sketching device is disposed beneath the sheet; and
   wherein the first pattern of raised bumps comprises at least 30 bumps per square inch of the sketching device.

2. The kit of claim 1, wherein the sketching device further comprises a second pattern of raised bumps, and wherein the second pattern is different from the first pattern.

3. The kit of claim 2, wherein the bumps of the first pattern are disposed to form a plurality of evenly spaced rows and columns, and the bumps of the second pattern are disposed to form a plurality of concentric circles.

4. The kit of claim 2, wherein the sketching device further comprises a third pattern of raised bumps, and wherein the third pattern is different from the first and second patterns.

5. The kit of claim 1, wherein a color of the sketching device is different from a color of the paper.

6. The kit of claim 1, wherein the sketching device further comprises first and second sides, and the first pattern is disposed on the first side, and wherein the second side comprises a second pattern of raised bumps.

7. The kit of claim 6, wherein the first and second patterns are different.

8. The kit of claim 1, wherein the sketching device further comprises first and second sides, and the first pattern is disposed on the first side, and wherein the second side comprises a grid.

9. The kit of claim 1, wherein the sketching device further comprises at least one fastener configured to retain a piece of paper.

10. The kit of claim 1, wherein the paper tablet comprises a sleeve configured to house at least a portion of the sketching device.

11. The kit of claim 1, wherein the sketching device is removably coupled to the paper tablet.

12. The kit of claim 10, wherein the sketching device is coupled to the paper tablet by a perforation.

13. The kit of claim 2, wherein at least one of the first and second patterns are disposed to form an alphanumeric character.

\* \* \* \* \*